United States Patent
Aarts et al.

(10) Patent No.: US 7,437,299 B2
(45) Date of Patent: Oct. 14, 2008

(54) CODING OF STEREO SIGNALS

(75) Inventors: Ronaldus Maria Aarts, Eindhoven (NL); Roy Irwan, Groningen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 495 days.

(21) Appl. No.: 10/510,219

(22) PCT Filed: Mar. 20, 2003

(86) PCT No.: PCT/IB03/01152

§ 371 (c)(1),
(2), (4) Date: Oct. 5, 2004

(87) PCT Pub. No.: WO03/085643

PCT Pub. Date: Oct. 16, 2003

(65) Prior Publication Data

US 2005/0141721 A1    Jun. 30, 2005

(30) Foreign Application Priority Data

Apr. 10, 2002  (EP)  ................... 02076410

(51) Int. Cl.
| | |
|---|---|
| G10L 21/04 | (2006.01) |
| G10L 19/00 | (2006.01) |
| G10L 19/02 | (2006.01) |
| H04R 5/00 | (2006.01) |
| H04H 20/49 | (2008.01) |

(52) U.S. Cl. .............. 704/500; 381/16; 381/23; 381/19; 381/22; 704/504; 704/E19.005; 704/229; 704/200.1

(58) Field of Classification Search .......... 381/16, 381/19–23, 17; 704/500, 504, 229, 200.1, 704/230, 226, E19.005
See application file for complete search history.

(56) References Cited

U.S. PATENT DOCUMENTS

| | | | | |
|---|---|---|---|---|
| 4,589,127 | A | * | 5/1986 | Loughlin ............ 381/16 |
| 5,291,557 | A | * | 3/1994 | Davis et al. ......... 381/22 |
| 5,511,093 | A | | 4/1996 | Edler et al. |
| 5,621,855 | A | | 4/1997 | Veldhuis et al. |
| 5,767,739 | A | | 6/1998 | Witte |
| 5,812,971 | A | * | 9/1998 | Herre ............. 704/230 |
| 6,121,904 | A | | 9/2000 | Levine |
| 6,430,295 | B1 | * | 8/2002 | Handel et al. ....... 381/94.7 |

FOREIGN PATENT DOCUMENTS

WO    03085643 A1    10/2003

OTHER PUBLICATIONS

Robert G. Van Der Waal, et al: Subband Coding of Stereophonic Digital Audio Signals, IEEE 1991 A1.8, pp. 3601-3604.

* cited by examiner

*Primary Examiner*—Vivian Chin
*Assistant Examiner*—Devona E. Faulk

(57) ABSTRACT

A method of encoding a multichannel signal, such as a stereophonic audio signal, including at least first and second signal components includes transforming at least the first and second signal components by a predetermined transformation into a principal signal including most of the signal energy and at least one residual signal including less energy than the principal signal. The predetermined transformation is parameterized by at least one transformation parameter. The method further includes representing the multichannel signal at least by the principal signal and the transformation parameter.

16 Claims, 6 Drawing Sheets

CODING OF STEREO SIGNALS

This invention relates to coding multichannel signals including a at least a first and a second signal component. More particularly, the invention relates to the coding of multiphonic audio signals, such as stereophonic signals.

Stereophonic audio signals comprise a left (L) and a right (R) signal component which may originate from a stereo signal source, for example from separated microphones. The coding of audio signals aims at reducing the bit rate of a stereophonic signal, e.g. in order to allow an efficient transmission of sound signals via a communications network, such as the Internet, via a modem and analogue telephone lines, mobile communication channels or other a wireless networks, etc., and to store a stereophonic sound signal on a chip card or another storage medium with limited storage capacity.

U.S. Pat. No. 4,589,127 discloses a transmitter for stereophonic signals which generates sum and difference signals of the stereo L and R signals. The sum and difference signals are subsequently used in a modulation scheme resulting in a modulated signal comprising both the sum and difference information.

However, the above prior art method does not address the problem of encoding a stereo signal with an efficient bit-rate utilisation, i.e. with a low bit rate for a given sound quality.

The above and other problems are solved by a method of encoding a multichannel signal including at least a first signal component and a second signal component, the method comprising the steps of transforming at least the first and second signal components by a predetermined transformation into a principal signal including most of the signal energy and at least one residual signal including less energy than the principal signal, the predetermined transformation being parameterised by at least one transformation parameter; and representing the multichannel signal at least by the principal signal and the transformation parameter.

Consequently, by transforming the multichannel signal into a principal signal which includes most of the energy and a residual signal which only includes little signal energy, the multichannel signal may be represented by the principal signal, the transformation parameter, and optionally a small residual signal, thereby improving the coding efficiency for the multichannel signal. Effectively, the multichannel signal may be encoded with a bit rate which is only slightly higher than that of a single channel, e.g. a mono channel. The resulting encoded signal may be stored and/or communicated to a receiver.

When the method further comprises the step of adaptively determining the transformation parameter based on at least the first and second signal components, the optimal transformation parameter may continuously be tracked, thereby ensuring the transformation remains optimal even if the characteristics of the input signal changes, e.g. in the example of an audio signal due to a moving sound source or changes in acoustic properties of the environment.

When the predetermined transformation is a rotation and the transformation parameter corresponds to an angle of rotation, a simple transformation is provided based only on a single parameter, the angle of rotation. By adapting the angle such that the signal components, e.g. the L and R signal components of a stereo signal, are rotated into a principal component signal and a residual signal, an efficient coding is provided while maintaining a high quality signal.

In a preferred embodiment of the invention, the step of representing the multichannel signal at least by the principal signal and the transformation parameter further comprises the step of representing the multichannel signal by the principal signal, the transformation parameter, and the residual signal, thereby further improving the quality of the encoded signal as no signal information is discarded. As the residual signal is small compared to the principal signal, the bit allocation may be traded between those signals. Furthermore, as the bit rate allocation may be varied, a mechanism for graceful degradation is provided, e.g. by adaptively increasing or decreasing the bit rate allowed for the residual signal.

Consequently, in a further preferred embodiment, the step of representing the multichannel signal by the principal signal, the transformation parameter, and the residual signal further comprises the steps of encoding the principal signal with a first bit rate; and encoding the residual signal with a second bit rate smaller than the first bit rate.

In another preferred embodiment, the method further comprises the step of estimating the residual signal from the principal signal using a prediction filter corresponding to a set of filter parameters; and the step of representing the multichannel signal at least by the principal signal and the transformation parameter comprises the step of representing the multichannel signal by the principal signal, the transformation parameter, and the set of filter parameters.

This embodiment of the invention is based on the recognition that for many multichannel signals, e.g. in the case of audio signals for music and speech signals, the residual signal may be estimated as a filtered version of the principal signal. Hence, when determining a set of filter parameters of an adaptive filter which models the residual signal, the filter parameters may be encoded together with the principal signal and the transformation parameter. Consequently, communicating the residual signal is avoided without loosing the information included in that signal, thereby providing an efficient encoding which preserves a high level of quality.

It is an advantage of the invention that it provides an efficient bit-rate utilisation, i.e. a coding scheme which uses a low bit rate for a given sound quality. The coding scheme according to the invention may be used to reduce the bit rate without significantly reducing the sound quality, to maintain the bit rate while improving the sound quality, or a combination of the above.

The invention further relates to a method of decoding multichannel signal information, the method comprising the steps of receiving a principal signal and a transformation parameter, the principal signal corresponding to a result of a predetermined transformation of at least a first and a second signal component of a multichannel source signal, the predetermined transformation being parameterised by at least the transformation parameter; and generating a first and a second decoded signal component by inversely transforming the received principal signal and at least one residual signal.

The present invention can be implemented in different ways including the methods described above and in the following, arrangements for encoding and decoding multichannel signals, respectively, a data signal, and further product means, each yielding one or more of the benefits and advantages described in connection with the first-mentioned method, and each having one or more preferred embodiments corresponding to the preferred embodiments described in connection with the first-mentioned method and disclosed in the dependant claims.

It is noted that the features of the methods described above and in the following may be implemented in software and carried out in a data processing system or other processing means caused by the execution of computer-executable instructions. The instructions may be program code means loaded in a memory, such as a RAM, from a storage medium or from another computer via a computer network Alternatively, the described features may be implemented by hard-wired circuitry instead of software or in combination with software.

The invention further relates to an arrangement for encoding a multichannel signal including at least a first signal component and a second signal component, the arrangement comprising first processing means adapted to transform at least the first and second signal components by a predetermined transformation into a principal signal including most of the signal energy and at least one residual signal including less energy than the principal signal, the predetermined transformation being parameterised by at least one transformation parameter; and second processing means adapted to represent the multichannel signal at least by the principal signal and the transformation parameter.

The invention further relates to an arrangement for decoding multichannel signal information, the arrangement comprising receiving means for receiving a principal signal and a transformation parameter, the principal signal corresponding to a result of a predetermined transformation of a first and a second multichannel source signal, the predetermined transformation being parameterised by at least the transformation parameter; and processing means for generating a first and a second multichannel signal by inversely transforming the received principal signal and a residual signal.

The above arrangements may be part of any electronic equipment including computers, such as stationary and portable PCs, stationary and portable radio communications equipment and other handheld or portable devices, such as mobile telephones, pagers, audio players, multimedia players, communicators, i.e. electronic organisers, smart phones, personal digital assistants (PDAs), handheld computers, or the like.

The term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The above first and second processing means may be separate processing means or they may be comprised in one processing means.

The term receiving means includes circuitry and/or devices suitable for enabling the communication of data, e.g. via a wired or a wireless data link. Examples of such receiving means include a network interface, a network card, a radio receiver, a receiver for other suitable electromagnetic signals, such as infrared light, e.g. via an IrDa port, radio-based communications, e.g. via Bluetooth transceivers, or the like. Further examples of such receiving means include a cable modem, a telephone modem, an Integrated Services Digital Network (ISDN) adapter, a Digital Subscriber Line (DSL) adapter, a satellite transceiver, an Ethernet adapter, or the like.

The term receiving means further comprises other input circuits/devices for receiving data signals, e.g. data signals stored on a computer-readable medium. Examples of such receiving means include a floppy-disk drive, a CD-Rom drive, a DVD drive, or any other suitable disc drive, a memory card adapter, a smart card adapter, etc.

The invention further relates to a data signal including multichannel signal information, the data signal being generated by a method described above and in the following. The signal may be embodied as a data signal on a carrier wave, e.g. as a data signal transmitted by communications means as described above and in the following.

The invention further relates to a computer-readable medium comprising a data record indicative of multichannel signal information generated by a method described above and in the following. The term computer-readable medium comprises magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

The invention further relates to a device for communicating a multichannel signal including at least a first signal component and a second signal component, the device comprising an arrangement for encoding the multichannel signal as described above and in the following.

These and other aspects of the invention will be apparent from and elucidated with reference to the embodiments and with reference to the drawing, in which.

Figure 7A:
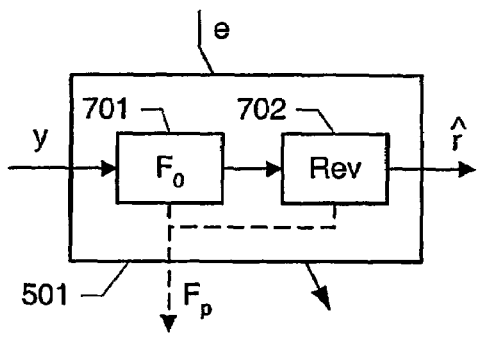
Figure 7B:
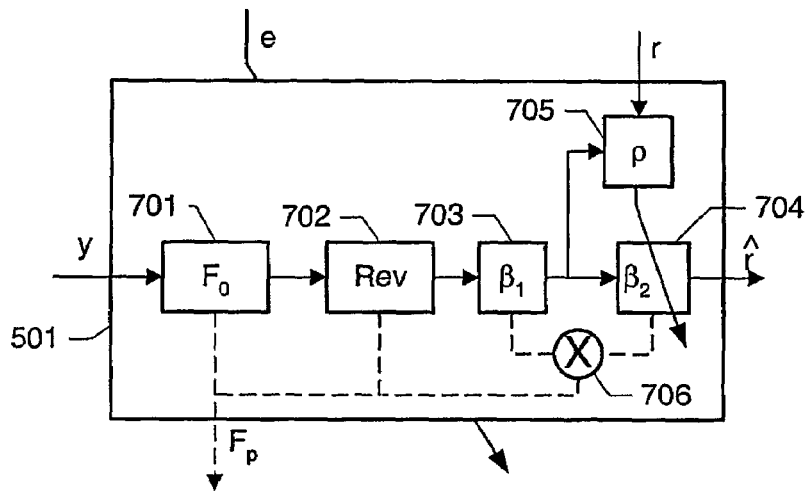
Figure 7C:
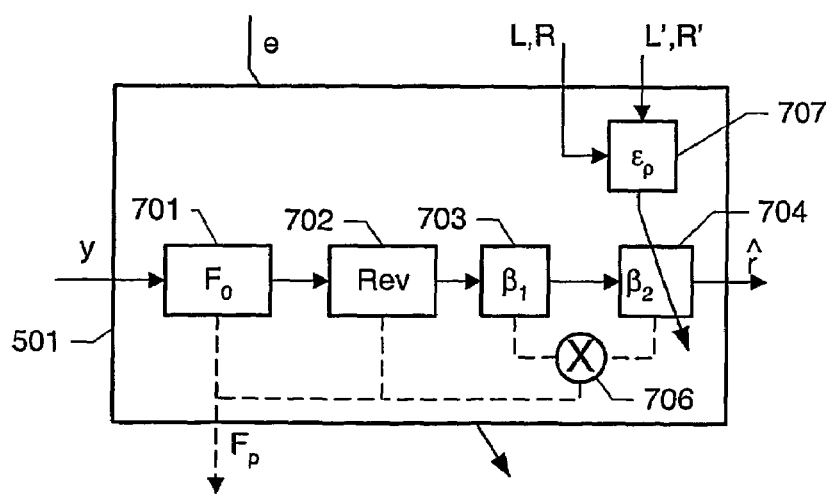
Figure 8:
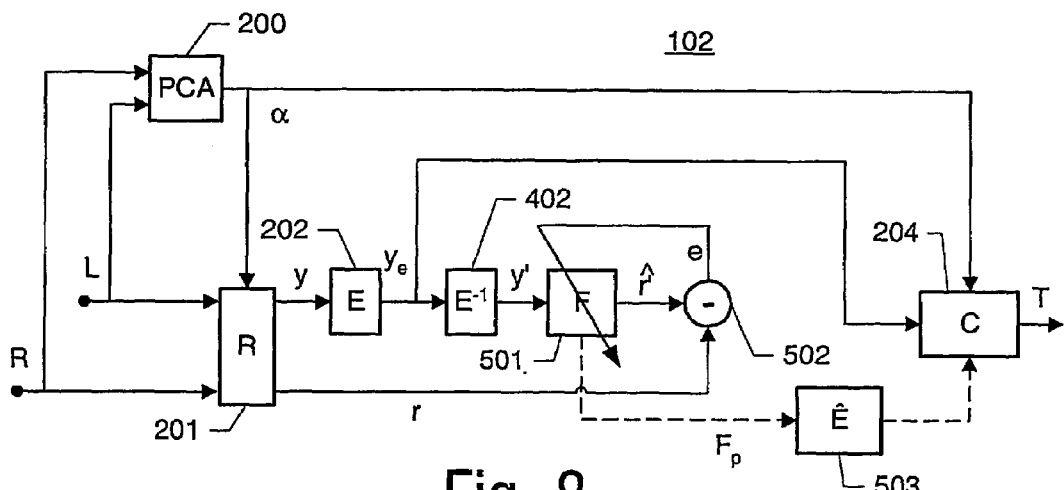
Figure 9:
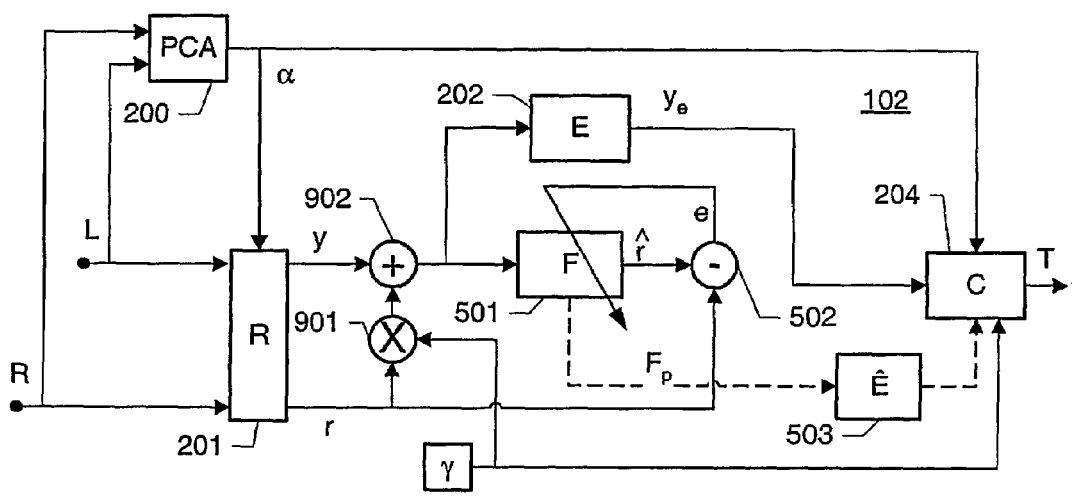
Figure 10:
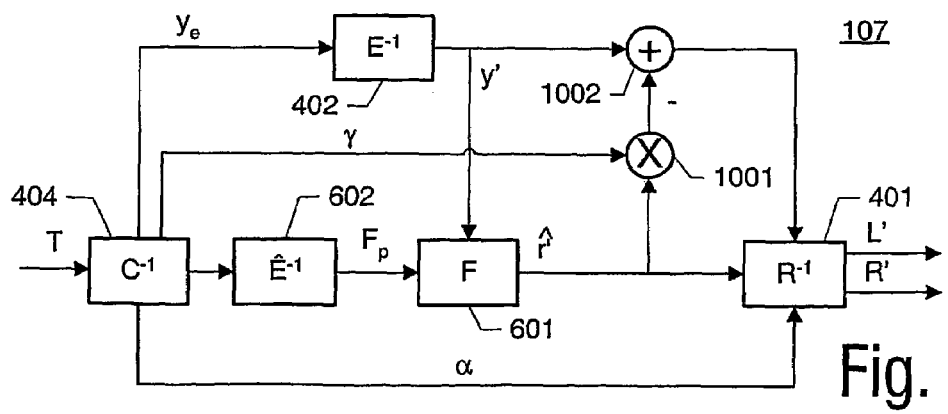
Figure 11:
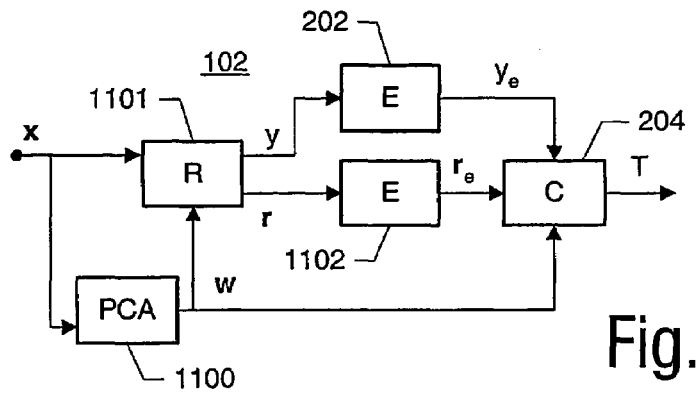
Figure 12:
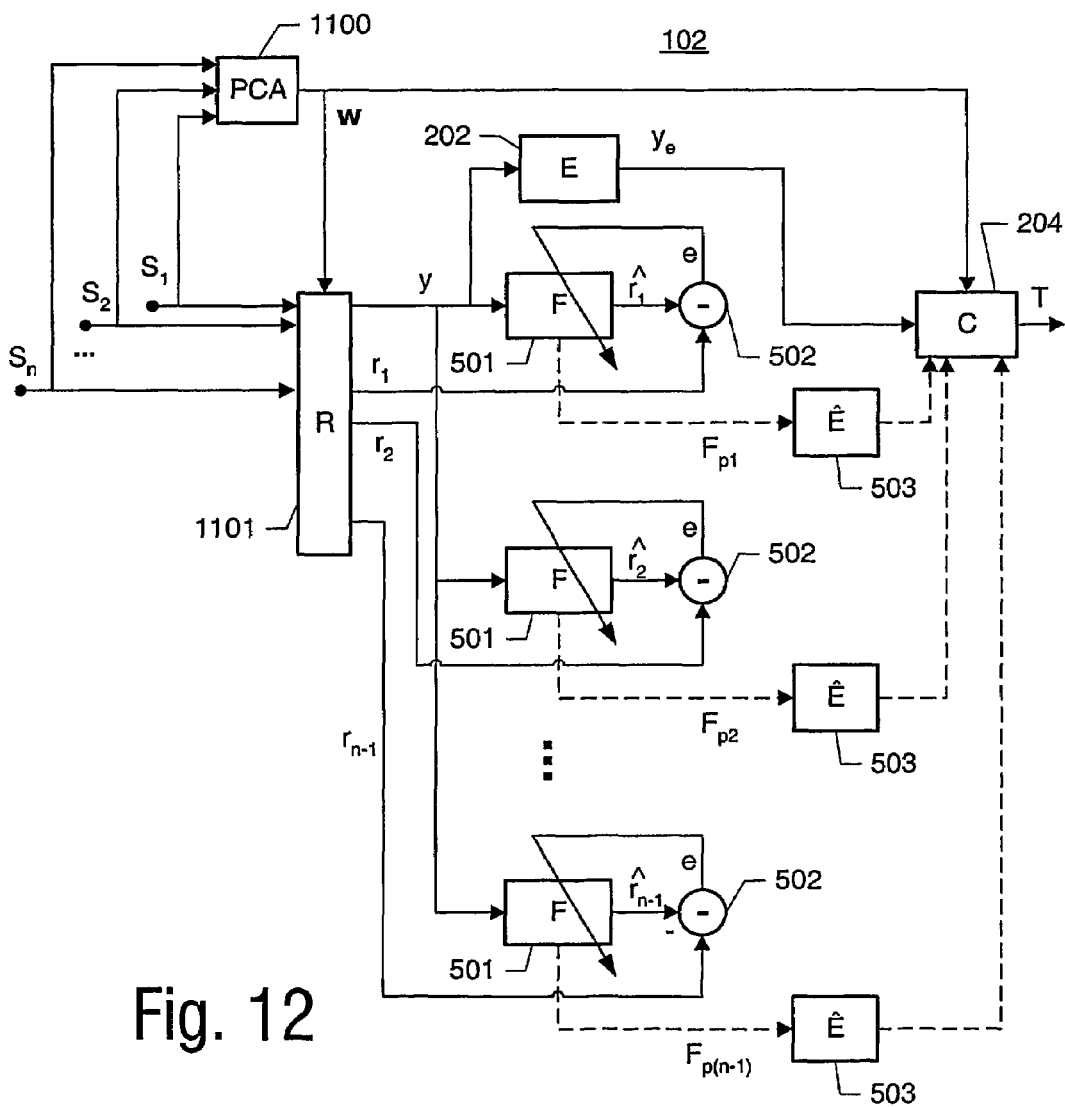
Figure 13:
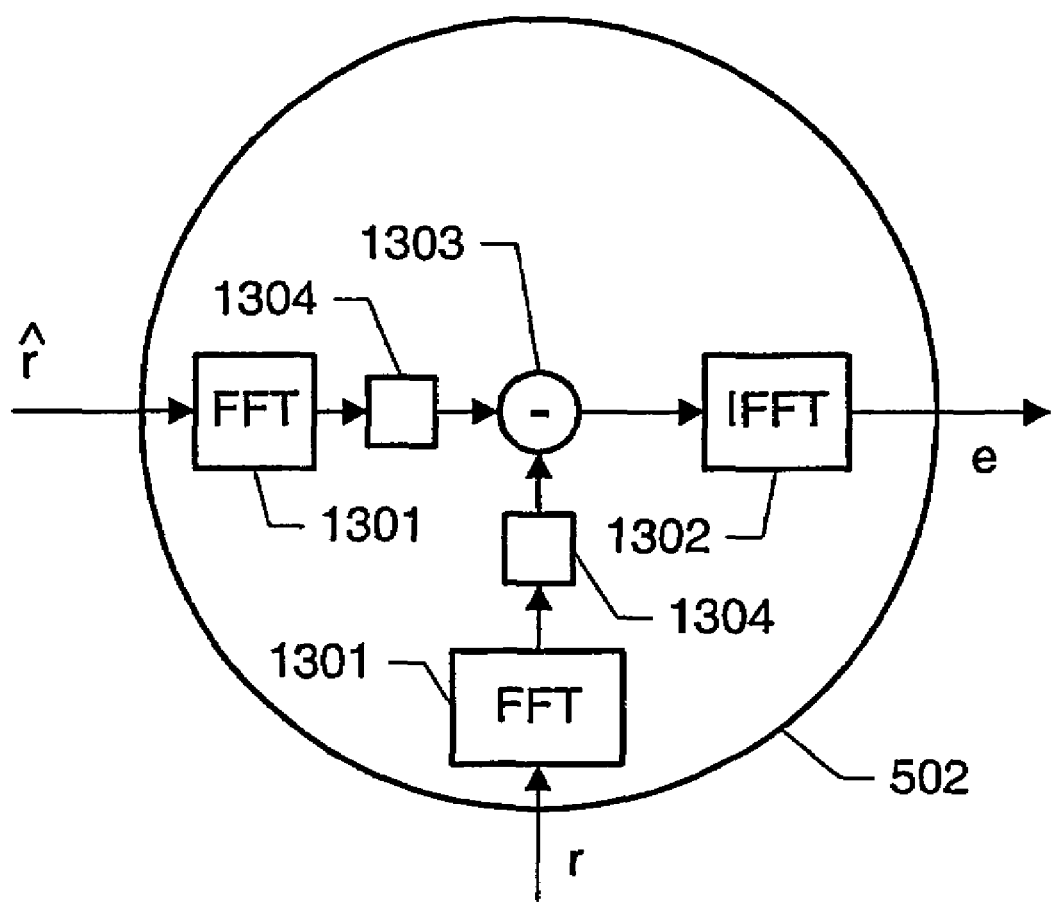

FIGS. 7a-c show schematic views of examples of a filter circuit for use in an embodiment of the invention;

FIG. 8 shows a schematic view of an arrangement for encoding a stereo signal according to a third embodiment of the invention;

FIG. 9 shows a schematic view of an arrangement for encoding a stereo signal according to a fourth embodiment of the invention;

FIG. 10 shows a schematic view of an arrangement for decoding a stereo signal according to the fourth embodiment of the invention;

FIG. 11 shows a schematic view of an arrangement for encoding a multichannel signal according to a fifth embodiment of the invention;

FIG. 12 shows a schematic view of an arrangement for encoding a multichannel signal according to a sixth embodiment of the invention; and FIG. 13 shows a schematic view of a subtraction circuit for use with an embodiment of the invention.

Figure 1:
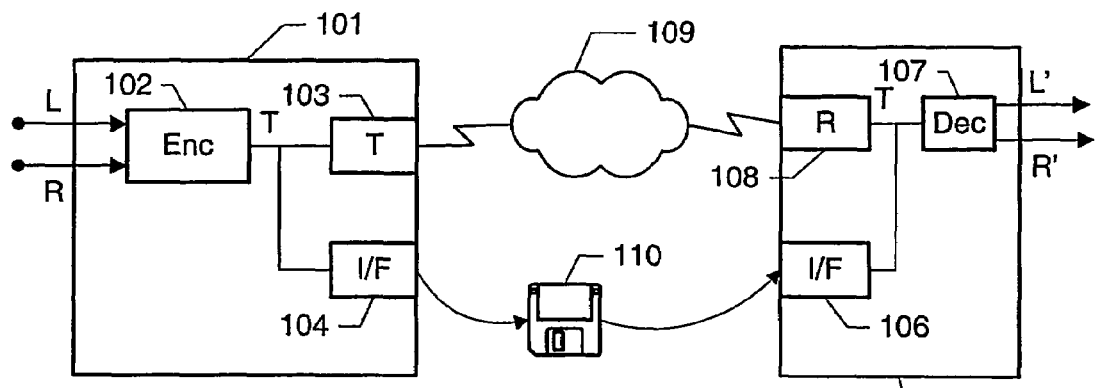
FIG. 1 shows a schematic view of a system for communicating stereo signals according to an embodiment of the invention.

FIG. 1 shows a schematic view of a system for communicating stereo signals according to an embodiment of the invention. The system comprises a coding device 101 for generating a coded stereophonic signal and a decoding device 105 for decoding a received coded signal into a stereo L signal and a stereo R signal component. The coding device 101 and the decoding device 105 each may be any electronic equipment or part of such equipment. Here the term electronic equipment comprises computers, such as stationary and portable PCs, stationary and portable radio communication equipment and other handheld or portable devices, such as mobile telephones, pagers, audio players, multimedia players, communicators, i.e. electronic organisers, smart phones, personal digital assistants (PDAs), handheld computers, or the like. It is noted that the coding device 101 and the decoding device may be combined in one electronic equipment where stereophonic signals are stored on a computer-readable medium for later reproduction.

The coding device 101 comprises an encoder 102 for encoding a stereophonic signal according to the invention, the stereophonic signal including an L signal component and an R signal component. The encoder receives the L and R signal components and generates a coded signal T. The stereophonic signal L and R, may originate from a set of microphones, e.g. via further electronic equipment, such as a mixing equipment, etc. The signals may further be received as an output from another stereo player, over-the-air as a radio signal, or by any other suitable means. Preferred embodiments of such an encoder according to the invention will be described below. According to one embodiment, the encoder 102 is connected to a transmitter 103 for transmitting the coded signal T via a communications channel 109 to the decoding device 105. The transmitter 103 may comprise circuitry suitable for enabling the communication of data, e.g. via a wired or a wireless data link 109. Examples of such a transmitter include a network interface, a network card, a radio transmitter, a transmitter for other suitable electromagnetic signals, such as an LED for transmitting infrared light, e.g. via an IrDa port, radio-based communications, e.g. via a Bluetooth transceiver, or the like. Further examples of suitable transmitters include a cable modem, a telephone modem, an Integrated Services Digital Network (ISDN) adapter, a Digital Subscriber Line (DSL) adapter, a satellite transceiver, an Ethernet adapter, or the like. Correspondingly, the communications channel 109 may be any suitable wired or wireless data link, for example of a packet-based communications network, such as the Internet or another TCP/IP network, a short-range communications link, such as an infrared link, a Bluetooth connection or another radio-based link. Further examples of the communications channel include computer networks and wireless telecommunications networks, such as a Cellular Digital Packet Data (CDPD) network, a Global System for Mobile (GSM) network, a Code Division Multiple Access (CDMA) network, a Time Division Multiple Access Network (TDMA), a General Packet Radio service (GPRS) network, a Third Generation network, such as a UMTS network, or the like. Alternatively or additionally, the coding device may comprise one or more other interfaces 104 for communicating the coded stereo signal T to the decoding device 105. Examples of such interfaces include a disc drive for storing data on a computer-readable medium 110, e.g. a floppy-disk drive, a read/write CD-ROM drive, a DVD-drive, etc. Other examples include a memory card slot a magnetic card reader/writer, an interface for accessing a smart card, etc. Correspondingly, the decoding device 105 comprises a corresponding receiver 108 for receiving the signal transmitted by the transmitter and/or another interface 106 for receiving the coded stereo signal communicated via the interface 104 and the computer-readable medium 110. The decoding device further comprises a decoder 107 which receives the received signal T and decodes it into corresponding stereo components L' and R'. Preferred embodiments of such a decoder according to the invention will be described below. The decoded signals L' and R' may subsequently be fed into a stereo player for reproduction via a set of speakers, head-phones, or the like.

Figure 2:
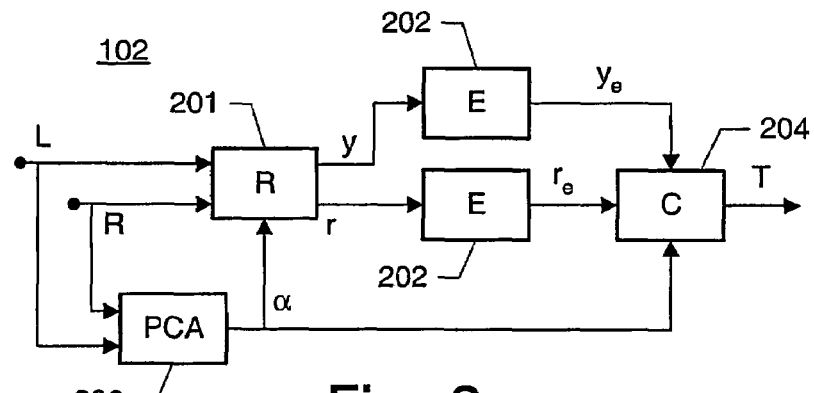
FIG. 2 shows a schematic view of an arrangement for encoding a stereo signal according to a first embodiment of the invention.

FIG. 2 shows a schematic view of an arrangement 102 for encoding a stereo signal according to a first embodiment of the invention. The arrangement comprises circuitry 201 for performing a rotation of the stereo signal in the L-R space by an angle $\alpha$, resulting in rotated signal components y and r according to the transformation $$y = L\cos\alpha + R\sin\alpha = w_L L + w_R R$$

$$r = -L\sin\alpha + R\cos\alpha = -w_R L + w_L R, \quad (1)$$

where $w_L = \cos\alpha$ and $w_R = \sin\alpha$ will be referred to as weighting factors.

According to the invention, the angle $\alpha$ is determined such that it corresponds to a direction of high signal variance. The direction of maximum signal variance, i.e. the principal component, may be estimated by a principal component analysis such that the rotated y component corresponds to the principal component signal which includes most of the signal energy, and r is a residual signal. Correspondingly, the arrangement of FIG. 2 comprises circuitry 200 which determines the angle $\alpha$ or, alternatively, the weight factors $w_L$ and $w_R$.

Figure 3:
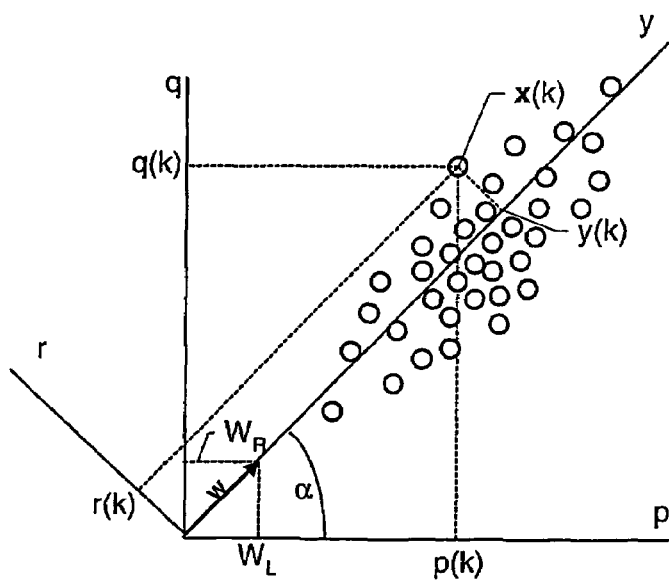
FIG. 3 illustrates the determination of the signal transformation according to an embodiment of the invention.

Referring to FIG. 3, according to a preferred embodiment, the above weight factors $w_L$ and $w_R$ are determined according the following algorithm:

Initially, the incoming stereo signals L and R are rectified and lowpass filtered, resulting in envelope signals p(k) of L and q(k) of R, respectively, where p(k) and q(k) are suitably sampled and the sample index is denoted k. Thus, the vector x(k)=(p(k), q(k)) denotes the incoming signal vector. Alternatively, the signals L and R may be used directly, i.e. without filtering, or other filtered versions of L and R may be used, e.g. highpass filtered signals L and R. In FIG. 3 a number of signal points are illustrated as circles. As an example, the signal point x(k) and its corresponding components p(k) and q(k) are indicated. According to the invention, the signals are rotated in the direction of the principal component of the signal vectors. In the example of FIG. 3, this corresponds to the y direction where $\alpha$ is the angle between the y direction and the p direction. The weight vector $w=(w_L, w_R)$ indicates the direction of the principal component, and the rotated components of x(k) are denoted y(k) and r(k), respectively.

The principal component may be determined by any suitable method known in the art. In a particularly advantageous embodiment, an iterative method utilising Oja's rule (see e.g. S. Haykin: "Neural Networks", Prentice Hall, N.J., 1999) is used. According to this embodiment, the weight vector w is iteratively estimated according to the following equation $$w(k) = w(k-1) + \mu[x(k-1) - w(k-1)y(k-1)], \quad (2)$$

where $w(k) = (w_L(k), w_R(k))$ corresponds to the estimate at time k. The above iteration may, for example, be initiated with a set of small random weights w(0), or in any other suitable way. The above estimated weight vector may be used to calculate the rotated signal according to $y(k) = w^T(k)x(k)$. Alternatively, the iteration of eqn. (2) may be performed on a block basis, e.g. for a block of N samples, where N depends on the particular implementation, for example, N=512, 1024, 2048, etc. In this embodiment, the estimated weight vector w(N) for a block may be used in the transformation of all samples of that block according to $y(k)=w^T(N)x(k)$.

The factor μ in eqn. (2) corresponds to a time scale of the tracking algorithm. If μ=0, the weighting factors and, thus, the angle α, remain constant, while they change rapidly for large μ. As an example, for a block size of 2048 samples, μ may be selected of the order of $10^{-3}$ for a sampling rate of 44.1 kHz.

It is an advantage of the above iterative algorithm that it is linear, i.e. it does not require the calculation of any trigonometric functions, square roots or the like. It is a further advantage, that the above iteration yields a normalised weight vector w, as the term –μw(k-1)y(k-1) in eqn. (2) corresponds to a weight decay term penalising large weights while the term +μx(k-1) drives the weight vector in the direction of the principal component. It is further noted that in the present embodiment, since x(k) is the envelope signal, $w_L, w_R \in [0,1]$, i.e. the weight vector w lies in the first quadrant in FIG. 3, thereby ensuring that μ is positive. It is a further advantage of this embodiment that it suffices to transmit one of $w_L$ and $w_R$, as the other factor may be determined according to $w_R = \sqrt{1-(w_L)^2}$. Alternatively, the angle α may be transmitted.

Again referring to FIG. 2, the circuit 200 outputs the determined angle α or, alternatively, one or both of the weight factors $w_L$ and $w_R$. The angle information is fed into the rotation circuit 201 which generates the rotated signal components y and r. It is understood that the circuits 200 and 201 may be combined in a single circuit performing the iterative calculation of eqn. (2) and the calculation of y and r according to eqn. (1).

The arrangement further comprises encoders 202 performing a proper encoding of the signals y and r, respectively. For example, the signals may be encoded according to MPEG, e.g. MPEG I layer 3 (MP3), according to sinusoidal coding (SSC), or audio coding schemes based on subband, parametric, or transform schemes, or any other suitable schemes or combination thereof. It is understood that the encoders 202 may be of the same type or of different types, e.g. one MP3 encoder and one SSC encoder, etc. The resulting coded signals $y_e$ and $r_e$, respectively, are fed into a combiner circuit 204 together with the angle information α. The combiner circuit 204 performs framing, bit-rate allocation, and lossless coding, resulting in a combined signal T to be communicated. In one embodiment, the angle α or, alternatively, $w_L$ and/or $w_R$ may be communicated as part of a header transmitted prior to a signal frame, a signal block, or the like. According to the invention, as the transformation angle α is tracked such that the principal component signal includes most of the signal energy, the bit rates allocated to the y and r signals may be selected to be different, thereby optimising the coding efficiency.

For example, the stereo signals L and R may be expressed as L=M+S and R=M-S, where M corresponds to a mid or centre signal and S corresponds to a stereo or side signal. In the case of an acoustic recording of a stationary sound source, e.g. a speaker recorded by two microphones, the L and R signals are substantially equal, if the speaker is positioned exactly between the microphones and assuming that there are no acoustic distortions such as reflections, etc. Hence, in this case S is substantially zero or at least small and the coding scheme according to the invention substantially yields y corresponding to L+R and r corresponding to L-R being zero or small; this corresponds to α=45 degrees. If the speaker is not positioned exactly between the microphones, i.e. there is an asymmetry, but still assuming that there are no reflections or other distortions, the rotated signal y according to the invention still corresponds to the speaker and the residual signal r is substantially zero. However, in this case the angle α differs from 45 degrees. If the sound source moves, e.g. from left to right, the method according to the invention still yields a principal component signal y corresponding to the source and a small residual signal r, ideally being r=0. In this case, α changes form 0 (fully left) to 90 degrees (fully right).

The above example illustrates the advantage of tracking the angle α. In the above situations it may suffice to transmit the principal component signal y and the angle α, in order to allow the decoder to reconstruct the original signals R and L without a significant loss in quality. In general, as the residual signal r is small compared to the principal signal, the bit allocation or coding efficiency is tradable between y and r. Hence, it is an advantage of the invention that it allows an efficient coding of stereo signals.

Figure 4:
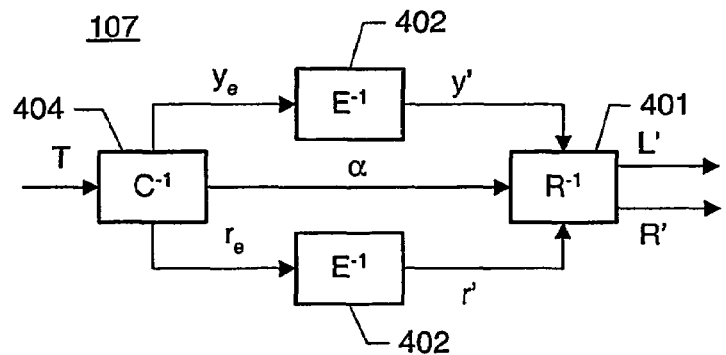
FIG. 4 shows a schematic view of an arrangement for decoding a stereo signal according to a first embodiment of the invention.

FIG. 4 shows a schematic view of an arrangement 107 for decoding a stereo signal according to the first embodiment of the invention. The arrangement receives a coded stereo signal T, for example originating from an encoder according to the embodiment described in connection with FIG. 2. The arrangement comprises a circuit 404 for extracting the encoded signals $y_e$ and $r_e$ and the angle information α from the combined signal T, i.e. the circuit 404 performs an inverse operation of the combiner 204 of FIG. 2. The extracted signals $y_e$ and $r_e$ are fed into corresponding decoders 402 performing audio decoding corresponding to the encoding performed by the encoders 202 of FIG. 2, resulting in the decoded principal component signal y' and the decoded residual signal r'. The signals y', r' and the angle information α are fed into a rotation circuit 401 which rotates the signals y', r' back in the direction of the original L and R components, thus resulting in the received signals L' and R'.

Figure 5:
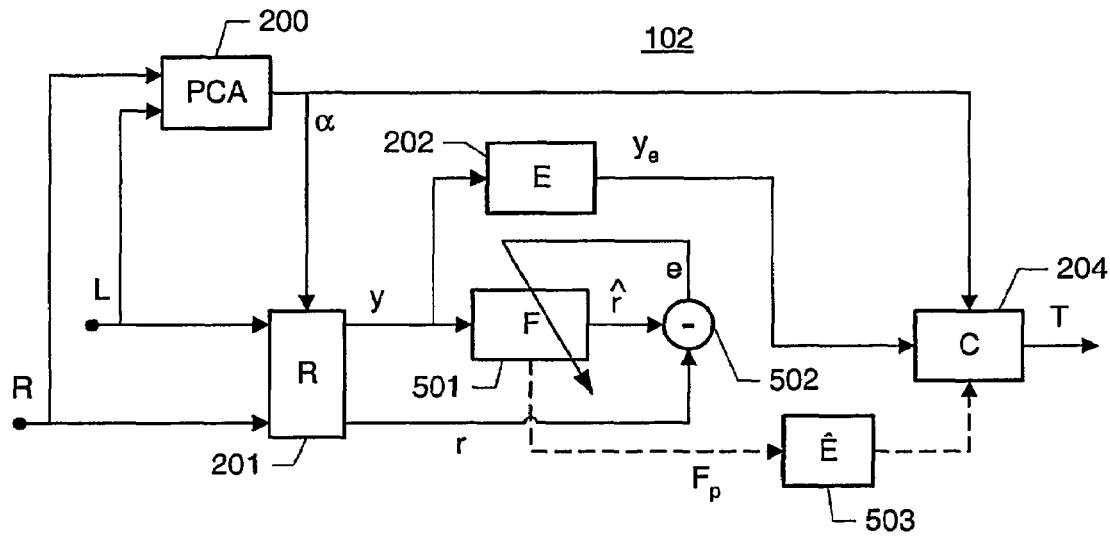
FIG. 5 shows a schematic view of an arrangement for encoding a stereo signal according to a second embodiment of the invention.

FIG. 5 shows a schematic view of an arrangement for encoding a stereo signal according to a second embodiment of the invention. The arrangement comprises circuitry 201 performing a rotation of the stereo signals L and R by an angle α, resulting in rotated signal components y and r, as described in connection with FIG. 2. The arrangement further comprises circuitry 200 for determining the angle of rotation as described in connection with FIGS. 2 and 3. According to this embodiment of the invention, it is recognised that the residual signal r may be estimated as a filtered version of the principal signal y. As described in connection with FIG. 2, in an acoustic recording of an audio source recorded by two microphones in the absence of acoustic distortions, e.g. due to reflections, etc., the principal signal y corresponds to the audio source and the residual signal is substantially zero. However, in a more realistic situation distortions are present, e.g. due to reflections of the signal at the walls of a room and at the head and torso of the speaker, etc. These effects influence the residual signal r. Consequently, when estimating the residual signal by a filter, the filter in effect models the room acoustics, etc. For a classical orchestra the situation is similar, while in the case of modem pop music the situation may be slightly different. In this case, a sound engineer typically mixes multiple channels into two channels, often using artificial reverberation, effect boxes etc. In this case the filter models the acoustic effects introduced by the mixing process.

Still referring to FIG. 5, the arrangement comprises an adaptive filter 501 receiving the principal signal y as an input and generating a filtered signal $\hat{r}$. The filter parameters $F_p$ of the adaptive filter are selected such that the filtered signal $\hat{r}$ approximates the residual signal r, e.g. by controlling the adaptive filter 501 by the error signal e indicating the difference between r and $\hat{r}$ as generated by a subtraction circuit 502.

The resulting filter parameters $F_p$ are fed into a combiner circuit 204, preferably after a proper encoding by an encoder 503, e.g. an encoder providing a Huffman encoding or any other suitable coding scheme. The filter 501 may be any suitable filter known in the art. Examples of such filters include a finite impulse response (FIR) filter or a infinite impulse response (IIR) filter, adaptive or fixed, with the cut-off frequencies and magnitudes being fixed or tracked recursively, or the like. The filter may be of any order, preferably smaller than 10. The type of the filter can be Butterworth, Chebychev, or any other suitable type of filter. The arrangement further comprises an encoder 202 for encoding the principal signal as described in connection with FIG. 2, resulting in the encoded principal signal $y_e$ which is fed into the combiner circuit 204 together with the filter parameters $F_p$ and the angle information $\alpha$. As described in connection with FIG. 2, the combiner circuit 204 performs framing, bit-rate allocation, and lossless coding, resulting in a combined signal T to be communicated which includes the encoded principal signal $y_e$, the filter parameters $F_p$ and the angle information $\alpha$. According to this embodiment of the invention, the bit rate to be allocated to the filter parameters $F_p$ may be considerably smaller than the bit rate necessary for the principal signal y, e.g. in one embodiment, the bit-rate for $F_p$ may, on average, be less than 10% of the bit rate for y. Hence, it is an advantage of the invention that it reduces the bit rate necessary for transmitting a stereo signal. The total bit rate according to the invention is only slightly higher than for a single mono channel. It is noted, however, that this ratio may vary during a recording. For example, the ratio may become smaller, e.g. in a situation with little distortions and a stationary source, but also larger, e.g. if the L and R signals are momentarily independent.

Figure 6:
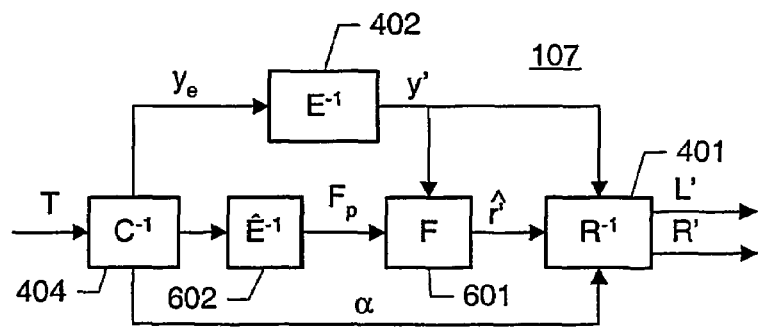
FIG. 6 shows a schematic view of an arrangement for decoding a stereo signal according to a second embodiment of the invention.

FIG. 6 shows a schematic view of an arrangement 107 for decoding a stereo signal according to the second embodiment of the invention. The arrangement receives a coded stereo signal T, for example originating from an encoder according to the embodiment described in connection with FIG. 5. The arrangement comprises a circuit 404 for extracting the encoded signal $y_e$, the filter parameters $F_p$, and the angle information $\alpha$ from the combined signal T, i.e. the circuit 404 performs an inverse operation of the combiner 204 of FIG. 5. The extracted signal $y_e$ is fed into a decoder 402 for performing audio decoding corresponding to the encoding performed by the encoder 202 of FIG. 5, resulting in the decoded principal component signal y'. Preferably, the filter parameters are decoded by a decoder 602 corresponding to the encoding of the filter parameters by the encoder 503 of FIG. 5. The signal y' is fed into a filter 601 together with the received filter parameters $F_p$. The filter 601 generates a corresponding estimated residual signal $\hat{r}'$. The received principal component signal y', the estimated residual signal $\hat{r}'$ and the received angle information $\alpha$ are fed into a rotation circuit 401 which rotates the signals y', $\hat{r}'$ back in the direction of the original L and R components, thus resulting in the received signals L' and R'.

In the embodiment described in connection with FIGS. 5 and 6, the filters 501 and 601 may be a standard adaptive filter in the temporal or time domain (see e.g. "Adaptive Filter Theory", by S. Haykin, Prentice Hall, 2001), e.g. an adaptive filter known from the field of echo cancellation. Other examples of filters include a fixed FIR or IIR filter with a fixed or adaptive cut-off-frequency and magnitude. Alternatively, in one embodiment, the filter may be based on a psychoacoustic model of the human auditory system, e.g. as is known from MPEG coding, thereby reducing the number of filter parameters. According to yet another embodiment the filter is further simplified, e.g. by using a $10^{th}$ order filter using 5 BiQuadratic filters and an artificial reverberation unit. In this embodiment, at the encoding side, the filter is fitted and the reverberation time is determined. These parameters are varying slowly, thereby reducing the necessary bit rate for their transmission.

FIGS. 7*a-c* show schematic views of examples of a filter circuit for use in an embodiment of the invention.

In the example of FIG. 7*a*, the filter 501 comprises a combination of a filter 701 and a reverberation filter 702. For example, the filter 701 may be a standard adaptive filter in the temporal or time domain, a fixed FIR or IIR filter with a fixed or adaptive cut-off-frequency and magnitude, etc., e.g. a high-pass filter. According to this embodiment, both the filter parameters of the filter 701 and the parameters of the reverberation filter 702, such as the reverberation time denoted $T_{60}$, are transmitted to the decoder as filter parameters $F_p$.

In the example of FIG. 7*b*, in addition to the filters 701 and 702, two control circuits 703-704 are added. A control circuit 703 is added to ensure that the average power of the residual signal r and the average power of the output of the reverberator 702 are approximately the same, e.g. by multiplying the output of the reverberator 702 with a parameter $\beta_1$. A second control circuit 704 multiplies the scaled output of the reverberator with $\beta_2$. The factor $\beta_2$ may be selected in the range between −3 dB and +6 dB and it is determined such that the cross correlation $\rho$ between r and $\hat{r}$ is as high as possible, i.e. that the signals r and $\hat{r}$ are as similar as possible. Hence, the filter arrangement of FIG. 7*b* further comprises a circuit 705 for determining the cross correlation $\rho$. The filter arrangement further comprises a multiplier 706 for generating the product $\beta = \beta_1 \cdot \beta_2$ which is output as a part of the filter parameters $F_p$. Hence, $\beta_1$ is a gain that is automatically controlled, e.g. by comparing the absolute mean of r and $\hat{r}$, and $\beta_2$ is another gain that is automatically controlled, e.g. by use of the cross-correlation coefficient $\rho$. The first gain is intended to make sure that the energy of r is preserved, i.e. that the energy of the predicted signal $\hat{r}'$ at the receiver corresponds to the energy of r. The second gain is to make sure that r and $\hat{r}'$ are well correlated.

In one embodiment, the reverberator 702 and the filter 701 may be fixed, i.e. not adapted according to the filter parameters $F_p$. Further, $\beta_2$ may be fixed, thereby leaving the slowly varying parameter $\beta_1$ as the only adaptive parameter which needs to be adjusted and transmitted. Consequently, a particularly simple filter arrangement is provided. It is an advantage of this embodiment that it only requires about half the original stereo bit rate for transmitting a stereo signal. It is noted that further variations of the above embodiment may be used. For example, in one embodiment the filter 701 may be left out.

Furthermore, alternatively or additionally to the correlation $\rho$, other measures of correlation may be used to ensure a high degree of similarity between the original signal and the signal after encoding-decoding. For example, in one embodiment two correlators may be used instead of correlator 705. One correlator may compute the cross-correlation $\rho_{LR}$ of the input signals L and R. Furthermore, a second correlator may compute the cross correlation $\rho'_{LR}$ of the resulting outputs L' and R' of the encoder-decoder, i.e. according to this embodiment, the encoder further comprises a decoder circuit for determining the signals L' and R'. This embodiment uses the difference $\epsilon_\rho = \rho_{LR} - \rho'_{LR}$ to control $\beta_2$ such that $\epsilon_\rho$ is minimal. This is illustrated in FIG. 7*c*, where the correlator of FIG. 7*b* is replaced by circuit 707 which receives the signals L and R as well as L' and R' as inputs and generates as an output a signal indicative of the difference $\epsilon_\rho$. The output $\epsilon_\rho$ of circuit 707 controls circuit 704 to scale the estimated residual r̂ such that $\epsilon_\rho$ is minimised. In one embodiment, the inputs to circuit 707 are high-pass filtered, e.g. at 250 Hz, such that the low frequencies have a decreasing contribution to $\epsilon_\rho$. As in the embodiment of FIG. 7b, it is an advantage of this embodiment that the correlation between the resulting stereo image and the original stereo image before the coding-decoding is very high.

FIG. 8 shows a schematic view of an arrangement for encoding a stereo signal according to a third embodiment of the invention. The arrangement is a variation of the embodiment described in connection with FIG. 5, and it comprises circuitry 201 for performing a rotation of the stereo signals L and R, circuitry 200 for determining the angle of rotation, an adaptive filter 501, a subtraction circuit 502, an encoder 202, an encoder 503, and a combiner circuit 204, as described in connection with FIG. 5. According to this embodiment, the principal component signal y is not directly fed into the filter 501. Instead, the arrangement further comprises a decoder 402 as described in connection with FIG. 6. The decoder 402 receives the encoded principal component signal $y_e$ generated by the encoder 202 and generates the decoded principal signal y' which is fed into the filter 501. It is an advantage of this embodiment that it reduces the effect of coding errors introduced by the coding and decoding of the signal y. These coding errors cause the decoded signal y' to be slightly different from the original signal y due to the fact that the decoder 402 in practice is not a perfect inverse of the encoder 202, i.e. $EE^{-1} \neq 1$. Consequently, by applying an encoding and decoding of the signal y at the decoder, the input y' to the filter 501 corresponds to the input y' fed into the filter 601 at the receiver, thereby improving the result of the prediction of r̂ of the residual signal at the receiver. Hence, the encoder according to this embodiment may be used in connection with a decoder according to the embodiment of FIG. 6.

FIG. 9 shows a schematic view of an arrangement for encoding a stereo signal according to a fourth embodiment of the invention. The arrangement is a variation of the embodiment described in connection with FIG. 5, and it comprises circuitry 201 for performing a rotation of the stereo signals L and R, circuitry 200 for determining the angle of rotation, an adaptive filter 501, a subtraction circuit 502, an encoder 202, an encoder 503, and a combiner circuit 204, as described in connection with FIG. 5. According to this embodiment, the principal component signal y is not directly fed into the filter 501. Instead, the arrangement further comprises a multiplication circuit 901 multiplying the residual signal r received from circuit 201 with a constant γ, and an adding circuit 902 for adding the scaled residual signal to the principal component signal y, resulting in a signal y+γr which is fed into the filter 501. Here, γ is a small positive value, e.g. of the order of $10^{-2}$. In one embodiment, the constant γ is tracked adaptively. It is an advantage of this embodiment that frequencies which are substantially not present in the spectrum of the signal y but present in the spectrum of r may be utilised in the modelling of the residual signal r̂ by the filter 501, thereby improving the quality of the coded signal. According to this embodiment the signal y+γr is fed into the encoder 202 which generates the decoded principal signal $y_e$ to be transmitted to the receiver. Furthermore, according to this embodiment, the constant γ is fed into the combiner 204 and transmitted to the receiver.

FIG. 10 shows a schematic view of an arrangement for decoding a stereo signal according to the fourth embodiment of the invention, i.e. suitable for decoding a signal received from an encoder according to FIG. 9. The arrangement comprises a circuit 404 for extracting the received information from the combined signal T, a decoder 402, a decoder 602, a filter 601, and a rotation circuit 401 as described in connection with FIG. 6. According to this embodiment, the circuit 404 further extracts the constant γ from the combined signal T, and the arrangement further comprises a multiplication circuit 1001 for multiplying the predicted residual signal r̂' generated by the filter 601 with the received constant γ. The arrangement further comprises a circuit 1002 for subtracting the resulting scaled predicted residual signal γr̂' from the decoded principal signal y'.

FIG. 11 shows a schematic view of an arrangement for encoding a multi-channel signal according to a fifth embodiment of the invention. The arrangement receives a multichannel signal $x=(x_1, \ldots, x_n)$ comprising n channels. The arrangement comprises a principal component analyser 1100 for performing a principal component analysis of the signal x, resulting in a weight vector $w=(w_1, \ldots, w_n)$ for transforming the input signal x into a principal component signal y and n-1 residual signals $r_1, r_2, \ldots, r_{n-1}$. The arrangement further comprises a transformation circuit 1101 receiving the input signal x and the determined weight vector w and generating the signals y and $r_1, \ldots, r_{n-1}$ according to the above transformation. The transformed signals are encoded by suitable encoders 202 and 1102 and combined by a combiner circuit 204 together with the weight vector w, as described in connection with FIG. 2. According to this embodiment, the encoder 1102 is adapted to encode the residual signals $r_1, \ldots, r_{n-1}$. For example, the encoder 1102 may comprise n-1 parallel encoders, each encoding one of the residual signals as described in connection with encoder 202.

FIG. 12 shows a schematic view of an arrangement for encoding a multi-channel signal according to a sixth embodiment of the invention. In addition to the transformation of a multichannel signal as described in connection with FIG. 11, according to this embodiment, the principal component signal is fed into a set of adaptive filters 501, each predicting one of the residual signals $r_1, \ldots, r_{n-1}$, as described in connection with FIG. 5, resulting in corresponding filter parameters $F_{p1}, \ldots, F_{p(n-1)}$ which are fed into corresponding encoders 503 and, subsequently, into the combiner 204. At a corresponding decoder (not shown), corresponding filters are used for generating estimates $r̂'_1, \ldots, r̂'_{n-1}$ of the residual signals based on the filter parameters, as described in connection with FIG. 6.

It is understood that, according to one embodiment, only a subset of residual signals, e.g. $r_1, \ldots, r_k$, k<n-1, maybe transmitted to the receiver or fed into corresponding filters, thereby reducing the necessary bit rate while maintaining most of the signal quality.

FIG. 13 shows a schematic view of a subtraction circuit for use with an embodiment of the invention. In the above embodiments of FIGS. 5, 8, 9, and 12, the filter parameters are determined by comparing a target signal with an estimated signal, i.e. by the error signal e indicating the difference between r and r̂ as generated by a subtraction circuit 502. It is understood that the subtraction circuit may generate different measures of difference between r and r̂, for example a difference may be determined in the time domain or in the frequency domain. Referring to FIG. 13, the circuit 502 may comprise circuits 1301 for transforming the signals r and r̂, respectively, into the frequency domain, e.g. by performing a fast Fourier transformation (FFT). The resulting frequency components may be further processed by respective circuits 1304. For example different frequencies may be weighted differently, preferably according to the properties of the human auditory system, thereby weighting differences in the audible frequency range more strongly. Other examples of further processing by the circuits 1304 include an averaging over predetermined frequency components, calculating the magnitude of the complex frequency components, clustering of filter components, or the like. For example, in a preferred embodiment, a clustering is performed prior to the subtraction in the frequency domain. This clustering may be performed using a filter-bank, e.g. with linear or logarithmic sub-bandwidths. Alternatively, the clustering may be performed using the so-called equivalent rectangular bandwidth (ERB) (see e.g. "An introduction to the Psychology of Hearing", by Brian Moore, Academic Press, London, 1997). The equivalent rectangular bandwidth technique clusters frequency-bands that correspond to the human auditory filters, e.g. the so-called critical bands. According to this embodiment, the corresponding value of the ERB as a function of centre frequency, f (in kHz), is maybe calculated according to ERB=24.7(4.37 f+1). Still referring to FIG. 13, the circuit 502 further comprises a subtraction circuit 1303 for subtracting the processed frequency components. Alternatively, the transformed signals generated by the circuits 1301 are directly fed into the subtraction circuit 1304 without further processing. The difference signal generated by the subtraction circuit 1304 is fed into a transformation circuit 1302 for transforming the error signal back into the time domain, e.g. by performing an inverse fast Fourier transform (IFFT). Alternatively, the difference signal in the frequency domain may be used directly.

It is understood that a skilled person may adapt the above embodiments, e.g. by adding or removing features, or by combining features of the above embodiments. For example, it is understood that the features introduced in embodiments of FIG. 8 and 9 may be incorporated in the embodiment of FIG. 12 as well. As another example, the error signal e describing the quality of the estimated residual signal in the embodiment of FIG. 5 may be compared to a threshold error indicating a maximum acceptable error. If the error is not acceptable, the error signal may, after suitable coding, be transmitted together with the signal T similar to the methods used within the field of Linear Predictive Coding (LPC).

It is further noted that the invention is not limited to stereophonic signals, but may also be applied to other multi-channel input signals having two or more input channels. Examples of such multi-channel signals include signals received from a Digital Versatile Disc (DVD) or a Super Audio Compact Disc, etc. In this more general case, a principal component signal y and one or more residual signals r may still be generated according to the invention. The number of residual signals transmitted depends on the number of channels and the desired bit rate, as higher order residuals may be omitted without significantly degrading the signal quality.

In general, it is an advantage of the invention that bit-rate allocation may be adaptively varied, thereby allowing graceful degradation. For example, if the communication channel momentarily only allows a reduced bit rate to be transmitted, e.g. due to increased network traffic, noise, or the like, the bit rate of the transmitted signal may be reduced without significantly degrading the perceptible quality of the signal. For example, in the case of a stationary sound source discussed above, the bit rate may be reduced by a factor of approximately two without significantly degrading the signal quality, corresponding to transmitting a single channel instead of two.

It is noted that the above arrangements may be implemented as general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of encoding a multichannel signal including at least a first signal component and a second signal component, the method comprising the acts of:
   transforming at least the first and second signal components by rotation into a principal signal including most of the signal energy and at least one residual signal including less energy than the principal signal, the rotation being parameterised by at least one angle of rotation, wherein said angle of rotation corresponds to a direction of high signal variance;
   representing the multichannel signal at least by the principal signal, the angle of rotation and the at least one residual signal;
   encoding the principal signal with a first bit rate; and
   encoding the at least one residual signal with a second bit rate smaller than the first bit rate; and
   adaptively determining the angle of rotation based on at least the first and second signal components.

2. The method according to claim 1, wherein the principal signal corresponds to a principal component of the first and second signal components.

3. The method according to claim 1, wherein the principal signal corresponds to a first signal energy and the at least one residual signal corresponds to a second signal energy smaller than the first signal energy.

4. The method according to claim 1, wherein
   the method further comprises the act of estimating the at least one residual signal from the principal signal using a prediction filter corresponding to a set of filter parameters; and
   the act of representing the multichannel signal at least by the principal signal and the angle of rotation comprises the act of representing the multichannel signal by the principal signal, the angle of rotation, and the set of filter parameters.

5. The method according to claim 1, wherein the multi-channel signal comprises a stereophonic signal including a left and a right signal component.

6. A method of decoding multichannel signal information, the method comprising the acts of:
   receiving a principal signal encoded with a first bit rate, at least one residual signal encoded with a second bit rate, and an angle of rotation, wherein the second bit rate is smaller than the first bit rate, the principal signal corresponding to a result of a rotation at least a first and a second signal component of a multichannel source signal, the rotation being parameterised by at least the angle of rotation, wherein the angle of rotation corresponds to a direction of high signal variance and is adaptively determined based on at least the first and second signal components; and generating a first and a second decoded signal component by inversely transforming the received principal signal and the at least one residual signal.

7. The method according to claim 6, wherein the act of receiving the principal signal and the angle of rotation further comprises the act of receiving a set of filter parameters, and the method further comprises the act of predicting the at least one residual signal from the principal signal using a prediction filter corresponding to the received set of filter parameters.

8. An arrangement for encoding a multichannel signal including at least a first signal component and a second signal component, the arrangement comprising:

first processing means adapted to transform at least the first and second signal components by a rotation into a principal signal including most of the signal energy and at least one residual signal including less energy than the principal signal, the rotation being parameterised by at least one angle of rotation, to encode the principal signal with a first bit rate; and to encode the at least one residual signal with a second bit rate smaller than the first bit rate; wherein the angle of rotation corresponds to a direction of high signal variance and is adaptively determined based on at least the first and second signal components; and second processing means adapted to represent the multichannel signal at least by the principal signal, the angle of rotation and the at least one residual signal.

9. An arrangement for decoding multichannel signal information, the arrangement comprising receiving means for receiving a principal signal encoded with a first bit rate, at least one residual signal encoded with a second bit rate, and an angle of rotation, wherein the second bit rate is smaller than the first bit rate, the principal signal corresponding to a result of a rotation of a first and a second multichannel source signal, the rotation being parameterised by at least the angle of rotation, wherein the angle of rotation corresponds to a direction of high signal variance and is adaptively determined based on at least the first and second signal components; and processing means for generating a first and a second multichannel signal by inversely transforming the received principal signal and a residual signal.

10. A computer-readable medium comprising computer program code executable by a computer to:

transform at least first and second signal components of a multichannel signal by a rotation into a principal signal including most of the signal energy and at least one residual signal including less energy than the principal signal, the rotation being parameterised by at least one angle of rotation, wherein the angle of rotation corresponds to a direction of high signal variance and is adaptively determined based on at least the first and second signal components;

represent the multichannel signal at least by the principal signal, the angle of rotation and the at least one residual signal;

encoding the principal signal with a first bit rate; and encoding the at least one residual signal with a second bit rate smaller than the first bit rate.

11. A device for communicating a multichannel signal including at least a first signal component and a second signal component, the device comprising an arrangement for encoding the multichannel signal, the arrangement including first processing means adapted to transform at least the first and second signal components by a rotation into a principal signal including most of the signal energy and at least one residual signal including less energy than the principal signal, the rotation being parameterised by at least one angle of rotation, wherein the angle of rotation corresponds to a direction of high signal variance and is adaptively determined based on at least the first and second signal components;

second processing means adapted to represent the multichannel signal at least by the principal signal, the angle of rotation and the at least one residual signal;

encoding the principal signal with a first bit rate; and encoding the at least one residual signal with a second bit rate smaller than the first bit rate.

12. A method of encoding a multichannel signal including at least a first signal component and a second signal component, the method comprising the acts of:

transforming at least the first and second signal components by a rotation into a principal signal including most of the signal energy and at least one residual signal including less energy than the principal signal, the rotation being parameterized by at least one angle of rotation, wherein said angle of rotation corresponds to a direction of high signal variance;

representing the multichannel signal at least by the principal signal, and the angle of rotation;

adaptively determining the angle of rotation based on at least the first and second signal components; and controlling a prediction filter by an error signal indicative of a difference of the at least one residual signal and an estimate of the at least one residual signal.

13. The method of claim 12, wherein the estimate of the at least one residual signal is formed from the principal signal using the prediction filter.

14. An arrangement for encoding a multichannel signal including at least a first signal component and a second signal component, the arrangement comprising:

first processing means adapted to transform at least the first and second signal components by a rotation into a principal signal including most of the signal energy and at least one residual signal including less energy than the principal signal, the rotation being parameterized by at least one angle of rotation, wherein said angle of rotation corresponds to a direction of high signal variance, and to control a prediction filter by an error signal indicative of a difference of the at least one residual signal and an estimate of the at least one residual signal, wherein the angle of rotation is adaptively determined based on at least the first and second signal components; and second processing means adapted to represent the multichannel signal at least by the principal signal and the angle of rotation.

15. A computer-readable medium comprising computer program code executable by a computer to:

transform at least first and second signal components of a multichannel signal by a rotation into a principal signal including most of the signal energy and at least one residual signal including less energy than the principal signal, the rotation being parameterized by at least one angle of rotation, wherein the angle of rotation corresponds to a direction of high signal variance and is adaptively determined based on at least the first and second signal components;

represent the multichannel signal at least by the principal signal and the angle of rotation; and control a prediction filter by an error signal indicative of a difference of the at least one residual signal and an estimate of the at least one residual signal.

16. A device for communicating a multichannel signal including at least a first signal component and a second signal component, the device comprising an arrangement for encoding the multichannel signal, the arrangement including first processing means adapted to transform at least the first and second signal components by a rotation into a principal signal including most of the signal energy and at least one residual signal including less energy than the principal signal, the rotation being parameterized by at least one angle of rotation, and to control a prediction filter by an error signal indicative of a difference of the at least one residual signal and an estimate of the at least one residual signal, wherein the angle of rotation corresponds to a direction of high signal variance and is adaptively determined based on at least the first and second signal components; and second processing means adapted to represent the multichannel signal at least by the principal signal and the angle of rotation.

* * * * *